UNITED STATES PATENT OFFICE.

JOHN JOHNSON, OF BROOKLYN, NEW YORK.

IMPROVEMENT IN LUBRICATING COMPOUNDS.

Specification forming part of Letters Patent No. 193,710, dated July 31, 1877; application filed July 19, 1877.

*To all whom it may concern:*

Be it known that I, JOHN JOHNSON, of Brooklyn, in the county of Kings and State of New York, have invented certain new and useful Improvements in Lubricating Compound; and I do hereby declare that the following is a full, clear, and exact description thereof, which will enable others skilled in the art to which it appertains to make and use the same.

This invention relates to lubricating compounds; and it consists in combining certain quantities of plumbago, soluble glass, asbestus, and whiting, whereby the whole may be molded into a hard compact form ready for use.

In making my compound I use the following ingredients, in about the proportions named: Six parts of plumbago, six parts of soluble glass, two parts of asbestus, and one part of whiting.

In combining these ingredients I take the soluble glass and whiting and mix well together, and then perform the same operation with the asbestus and plumbago. Then I take the two parts and mix together, after which the whole may be run into a mold of any desired shape and allowed to become hard, and in this condition I design it to be used.

By thus producing a lubricator which dispenses with the use of oil, I not only overcome the difficulty of using an oil-can, but also dispense with all waste, and admit of the entire amount of the lubricant being used.

Having thus fully described the invention, what is claimed as new, and desired to be secured by Letters Patent, is—

A lubricating compound consisting of plumbago, soluble glass, asbestus, and whiting, in about the proportions named, the whole adapted to be molded into any desired form, for the purposes set forth.

In testimony that I claim the foregoing as my own I have hereunto affixed my signature in presence of two witnesses.

JOHN JOHNSON.

Witnesses:
 WM. P. UPPERMAN,
 FRANK GALT.